(12) United States Patent
Tuukkanen

(10) Patent No.: US 10,859,393 B2
(45) Date of Patent: Dec. 8, 2020

(54) APPARATUS AND ASSOCIATED METHODS FOR INDICATING ROAD DATA GATHERER UPLOAD ZONES

(71) Applicant: HERE Global B.V., Eindhoven (NL)

(72) Inventor: Marko Tapio Tuukkanen, Schlenzer (DE)

(73) Assignee: HERE Global B.V., Eindhoven (NL)

(*) Notice: Subject to any disclaimer, the term of this patent is extended or adjusted under 35 U.S.C. 154(b) by 193 days.

(21) Appl. No.: 16/069,709

(22) PCT Filed: Jan. 20, 2017

(86) PCT No.: PCT/EP2017/051169
§ 371 (c)(1),
(2) Date: Jul. 12, 2018

(87) PCT Pub. No.: WO2017/125539
PCT Pub. Date: Jul. 27, 2017

(65) Prior Publication Data
US 2019/0017836 A1     Jan. 17, 2019

(30) Foreign Application Priority Data

Jan. 21, 2016  (EP) .................................... 16152202

(51) Int. Cl.
*G01C 21/32*     (2006.01)
*G08G 1/01*      (2006.01)
(Continued)

(52) U.S. Cl.
CPC ......... *G01C 21/3492* (2013.01); *G01C 21/32* (2013.01); *G01C 21/3688* (2013.01);
(Continued)

(58) Field of Classification Search
CPC ............... G01C 21/32; G01C 21/3449; G01C 21/3407; G01C 21/3688; G08G 1/0128;
(Continued)

(56) References Cited

U.S. PATENT DOCUMENTS 8,566,010 B2  10/2013  Sarma et al.
8,849,494 B1   9/2014  Herbach et al.
(Continued)

FOREIGN PATENT DOCUMENTS

JP       2010039674 A      2/2010
WO    WO2014139821 A1      9/2014

OTHER PUBLICATIONS

European Search Report for European Patent Application No. 16152202.4-1003 dated Feb. 25, 2019.
(Continued)

*Primary Examiner* — Tan Q Nguyen
(74) *Attorney, Agent, or Firm* — Lempia Summerfield Katz LLC

(57) ABSTRACT

An apparatus comprising a processor and memory including computer program code, the memory and computer program code configured to, with the processor, enable the apparatus at least to:
generate an indication of one or more communication network receiver upload zones for a road data gatherer along a planned route to be traveled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data; and
(Continued)

provide the indication to guide uploading of the road data gathered by the road data gatherer.

18 Claims, 5 Drawing Sheets

(51) Int. Cl.
    *G01C 21/34* (2006.01)
    *G01C 21/36* (2006.01)
    *H04W 28/26* (2009.01)
    *H04W 28/20* (2009.01)

(52) U.S. Cl.
    CPC ......... *G08G 1/0112* (2013.01); *G08G 1/0129* (2013.01); *G08G 1/0133* (2013.01); *G08G 1/0141* (2013.01); *G01C 21/3407* (2013.01); *H04W 28/20* (2013.01); *H04W 28/26* (2013.01)

(58) Field of Classification Search
    CPC ... G08G 1/0133; G08G 1/0141; H04W 28/20; H04W 28/26
    USPC .......................................................... 701/414
    See application file for complete search history.

(56) References Cited

U.S. PATENT DOCUMENTS

| | | |
|---|---|---|
| 10,264,402 B2* | 4/2019 | Davidsson ............ G06F 16/904 |
| 2002/0169778 A1* | 11/2002 | Natesan ................. G01C 21/32 |
| 2003/0018428 A1 | 1/2003 | Knockeart et al. |
| 2004/0054444 A1 | 3/2004 | Abeska et al. |
| 2005/0099322 A1 | 5/2005 | Wainfan et al. |
| 2005/0209927 A1 | 9/2005 | Aaltonen et al. |
| 2011/0159800 A1* | 6/2011 | Ueoka .................... H04H 20/12 455/3.06 |
| 2013/0211656 A1 | 8/2013 | An et al. |
| 2013/0282869 A1 | 10/2013 | Mate et al. |
| 2014/0036656 A1* | 2/2014 | Chou ...................... H04W 4/70 370/216 |
| 2014/0052374 A1* | 2/2014 | Hoch .................. G01C 21/343 701/533 |
| 2015/0088335 A1 | 3/2015 | Lambert et al. |

OTHER PUBLICATIONS

Hull, Bret, et al. "CarTel: a distributed mobile sensor computing system." Proceedings of the 4th international conference on Embedded networked sensor systems. ACM, 2006.
PCT International Search Report dated Feb. 21, 2017, for corresponding PCT/EP2017/051169.

* cited by examiner

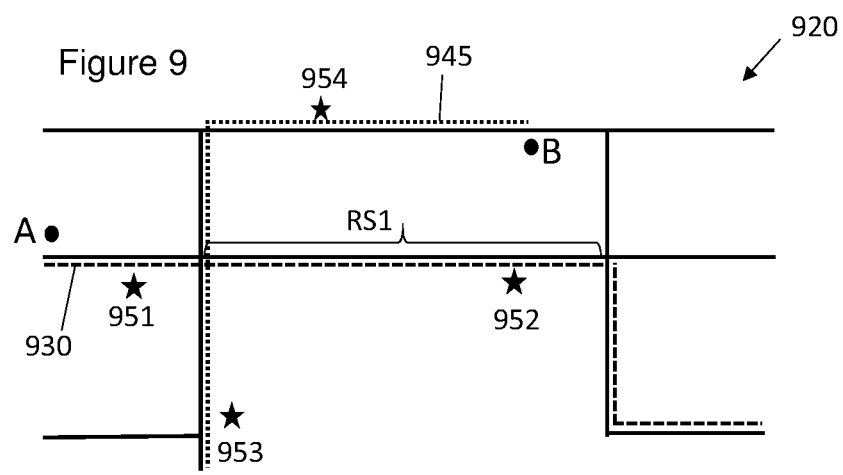
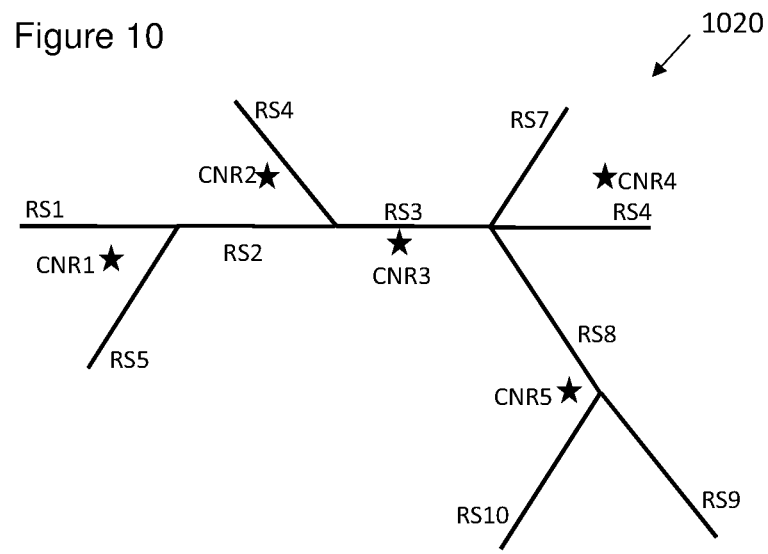

Figure 11

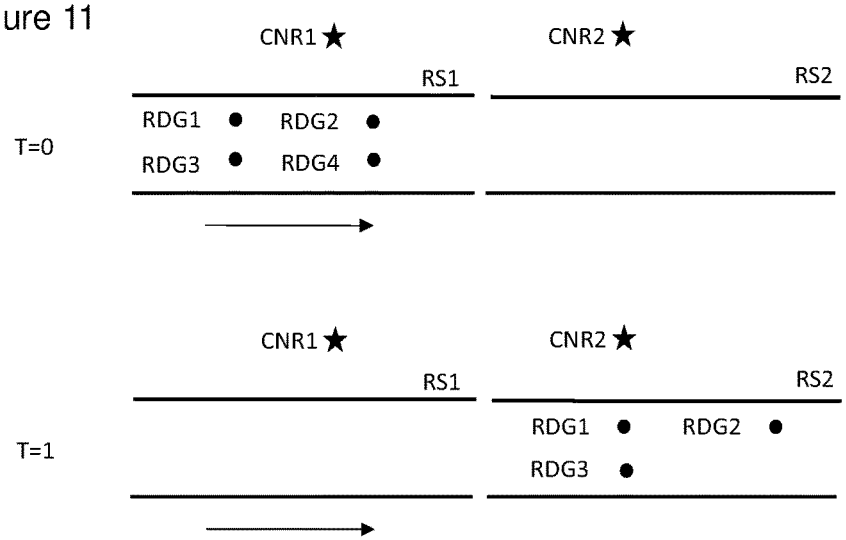

Figure 12    S1260 generate an indication of one or more communication network receiver upload zones for a road data gatherer along a planned route to be travelled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data provide the indication to guide the uploading of the road data gathered by the road data gatherer

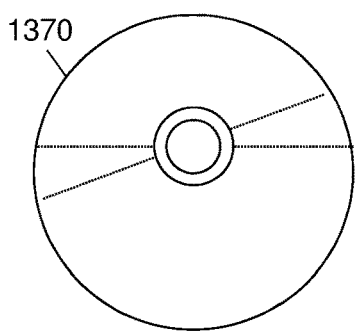

APPARATUS AND ASSOCIATED METHODS FOR INDICATING ROAD DATA GATHERER UPLOAD ZONES

This application is filed under 35 U.S.C. 371 claiming benefit of PCT Application No. PCT/EP2017/051169, filed on Jan. 20, 2017, which claims the benefit EP 16152202.4, filed on Jan. 21, 2016, the contents of each of which are incorporated herein by reference.

TECHNICAL FIELD

The present disclosure relates to the field of road data gatherer upload zones, associated methods and apparatus, and in particular concerns an apparatus configured to indicate a communication network receiver upload zone for a road data gatherer. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs), smartwatches, smart eyewear and tablet PCs. In some example embodiments, the apparatus may be built in to a vehicle, for example, as part of a (e.g. satellite) navigation system.

The portable electronic devices/apparatus according to one or more disclosed example aspects/embodiments may not be limited to just navigation/road mapping functionality but may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Road data is used for many purposes, including road-based route guidance and generation of digital maps. Road data may be obtained by road data gatherers (e.g. driverless vehicles or driver vehicles), which may upload gathered road data to a receiver, server or network. Road data is often gathered by autonomous vehicles as they move within the road network, this data allowing the road data gatherer/vehicle to navigate to a desired destination safely. Of course, non-autonomous vehicles may also gather road data as they are driven within the road network. The road data gathering capability of a road data gatherer may, or may not, be a primary function of the vehicle.

The listing or discussion of a prior-published document or any background should not necessarily be taken as an acknowledgement that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:

generate an indication of one or more communication network receiver upload zones for a road data gatherer along a planned route to be traveled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data; and provide the indication to guide uploading of the road data gathered by the road data gatherer.

Generation and provision of an indication of one or more communication network receiver upload zones for a road data gatherer along a planned route, using a predetermined upload criterion which takes account of both a planned route to be traveled by a road data gatherer and the bandwidth capacities of network receivers along the planned route, can help prevent network timeouts which can occur when the network has insufficient bandwidth available to allow gathered road data to be uploaded. The use of such an indication to guide uploading can make the uploading of gathered road data more efficient and can help to reduce bandwidth congestion in network receivers along a planned route. Dependent upon the strictness of the protocols which are adopted, the indication could further control the uploading so it could be considered to dictate the uploading in a strictly adopted protocol.

The apparatus may be configured such that the predetermined upload criterion takes accounts of one of:
the bandwidth capacities of communication network receivers along the planned route for a particular road data gatherer independently of planned routes of other road data gatherers; and
the bandwidth capacities of communication network receivers along the planned route for a particular road data gatherer dependent on the planned routes of other road data gatherers.

The apparatus may be configured such that the predetermined upload criterion takes accounts of the bandwidth capacities of communication network receivers along the planned route for a particular road data gatherer dependent on the planned routes of other road data gatherers by considering the expected proximity of multiple road data gatherers to a particular communications network receiver at a particular time.

The apparatus may be configured to update the indication during the planned route traveled by the road data gatherer based on one or more of:
an update to the planned route of the road data gatherer;
an update to the planned route of another road data gatherer;
a change in bandwidth capacity of a communications network receiver; and
an update relating to the amount of road data gathered by the road data gatherer or a road data gatherer in proximity to the road data gatherer.

The indication of one or more upload zones may be a positive indication which indicates one or more of:
permission for the road data gatherer to upload gathered road data to a communication network receiver associated with the upload zone; and
an upload priority for road data gathered by the road data gatherer in respect of a permitted communication network receiver, the upload priority prioritising one or more of one aspect of the gathered road data and one road data gatherer over another road data gatherer.

The positive indication may allocate a particular amount of bandwidth, proportion of bandwidth or number of upload sub-slots for the road data gatherer. The road data gatherer may be able to upload road data to the one or more upload zones using this allocated bandwidth.

The indication of one or more upload zones may be a negative indication which indicates one or more of:
  denial of permission for the road data gatherer to upload gathered road data to a communication network receiver associated with the upload zone; and
  an upload priority for road data gathered by the road data gatherer in respect of a permitted communication network receiver, the upload priority de-prioritising one or more of one aspect of the gathered road data and one road data gatherer over another road data gatherer.

The indication of one or more upload zones may be an indication for a particular time period/time slot. The indication may specify the time period. The time period may be implicit in the indication.

The indication of one or more upload zones may comprise one or more of:
  an identification of one or more communication network receivers;
  an indication of one or more geographic areas; and
  an identification of one or more road segments or portions of road segments associated with the one or more upload zones.

The apparatus may be configured such that the indication is provided to one or more of:
  a communication network receiver associated with an indicated upload zone;
  the road data gatherer; and
  a server or a module for one of the same.

Such apparatus (receiver/road data gatherer/server or module for the same) will, of course, be configured to appropriately use the indication to govern/control/dictate/guide the uploading of the gathered road data according to the indicated upload zone.

At least one of the road data gatherer and the communication network receiver may be configured to infer, based on the provided indication of one or more upload zones, permission or denial of permission for the road data gatherer to upload gathered road data to a communication network receiver associated with a particular non-indicated upload zone.

The apparatus may be configured to calculate a planned route to be traveled by the road data gatherer based on a received destination to be traveled to by the road data gatherer.

A road data gatherer may be one or more of: a manual vehicle, a semi-autonomous vehicle, an autonomous vehicle, a navigation device or a module for one of the same.

The road data gathered by the road data gatherer may relate to one or more of: current weather conditions, environmental conditions, road conditions, road obstructions, peripheral scenery, objects in a line of sight, new buildings along a road, and moving objects on or along a road.

The apparatus (which provides/uses the indication) may be one or more of an electronic device, a portable electronic device, a portable telecommunications device, a navigation device, a satellite navigation device, a mobile phone, a personal digital assistant, a tablet, a phablet, a desktop computer, a laptop computer, a server, a smartphone, a smartwatch, smart eyewear, a manual vehicle, an autonomous vehicle, a semi-autonomous vehicle and a module for one or more of the same.

According to a further aspect, there is provided an apparatus comprising a processor and memory including computer program code, the memory and computer program code configured to, with the processor, enable the apparatus at least to:
  generate an indication of one or more communication network receiver upload zones for a road data gatherer along a planned route to be traveled by the road data gatherer, the indication specifying communication network receivers to be used or not used by the road data gatherer for the uploading of road data in a particular time period, wherein the indication is determined according to a predetermined upload criterion which takes account of the available bandwidth capacities of communication network receivers along the planned route; and
  provide the indication to guide uploading of the road data gathered by the road data gatherer.

An indication specifying communication network receivers to be used may be a positive indication which indicates one or more of:
  permission for the road data gatherer to upload gathered road data to a communication network receiver associated with the upload zone; and
  an upload priority for road data gathered by the road data gatherer in respect of a permitted communication network receiver, the upload priority prioritising one or more of one aspect of the gathered road data and one road data gatherer over another road data gatherer.

An indication specifying communication network receivers to not be used may be a negative indication which indicates one or more of:
  denial of permission for the road data gatherer to upload gathered road data to a communication network receiver associated with the upload zone; and
  an upload priority for road data gathered by the road data gatherer in respect of a permitted communication network receiver, the upload priority de-prioritising one or more of one aspect of the gathered road data and one road data gatherer over another road data gatherer.

According to a further aspect, there is provided a computer-implemented method comprising:
  generating an indication of one or more communication network receiver upload zones for a road data gatherer along a planned route to be traveled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data; and
  providing the indication to guide uploading of the road data gathered by the road data gatherer.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means or functional units (e.g. indication generator, indication user) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIG. 9 illustrates schematically the example road network of FIG. 6 and planned routes of two road data gatherers;

FIG. 10 illustrates schematically an example road network according to an embodiment of the present disclosure.

FIG. 11 illustrates schematically an example road network according to an embodiment of the present disclosure.

FIG. 12 illustrates schematically the main steps of a method described herein; and FIG. 13 shows a computer-readable medium comprising a computer program configured to perform, control or enable one or more methods described herein.

DESCRIPTION OF SPECIFIC ASPECTS/EMBODIMENTS

As previously mentioned, road data is used for many purposes, including road-based route guidance and generation of digital maps. Road data may be obtained by road data gatherers (e.g. driverless/autonomous vehicles or driver/manual vehicles), which may upload gathered road data to a server or network. One uploading method is to upload road data to receivers distributed along a road network (by autonomous and non-autonomous road data gatherers, whether or not the primary function of the road data gatherer is to gather road data).

Road data gatherers typically gather/generate large amounts of road data (typically hundreds of gigabytes of data for every kilometer driven), and uploading this gathered data requires a large amount of bandwidth capacity from the network. Network timeouts can occur when the network has insufficient bandwidth available to allow data to be uploaded.

There will now be described an apparatus and associated methods that may provide a possible solution.

Figure 1:
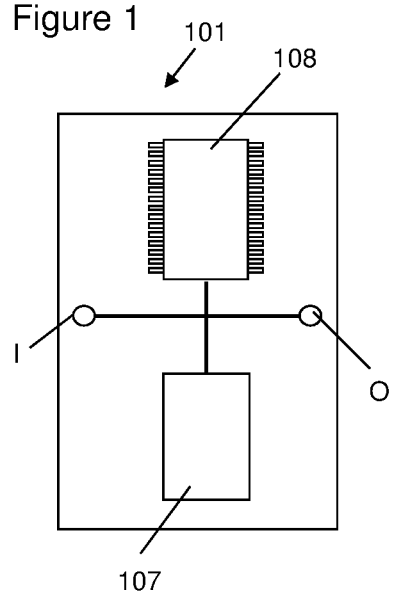
FIG. 1 illustrates an example apparatus embodiment comprising a number of electronic components, including memory and a processor, according to embodiments of the present disclosure.

FIG. 1 shows an apparatus 101 comprising memory 107, a processor 108, input I and output O. In this embodiment only one processor and one memory are shown but it will be appreciated that other embodiments may utilise more than one processor and/or more than one memory (e.g. same or different processor/memory types).

In this embodiment the apparatus 101 is an Application Specific Integrated Circuit (ASIC) for a portable electronic device with a touch sensitive display. In other embodiments the apparatus 101 can be a module for such a device, or may be the device itself, wherein the processor 108 is a general purpose CPU of the device and the memory 107 is general purpose memory comprised by the device. The apparatus 101, in certain embodiments, may be a (e.g. road network) server or a module for the same.

The input I allows for receipt of signalling to the apparatus 101 from further components, such as components of a portable electronic device (like a touch-sensitive or hover-sensitive display) or the like. The output O allows for onward provision of signalling from within the apparatus 101 to further components such as a display screen, speaker, or vibration module. In this embodiment the input I and output O are part of a connection bus that allows for connection of the apparatus 101 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more example embodiments, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
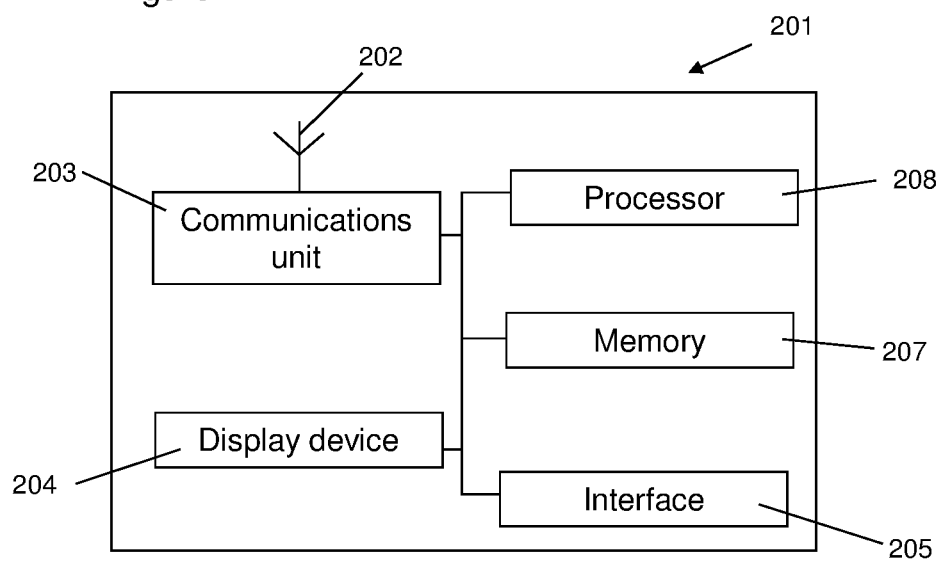
FIG. 2 illustrates an example apparatus embodiment comprising a number of electronic components, including memory, a processor and a communication unit, according to embodiments of the present disclosure.

FIG. 2 depicts an apparatus 201 of a further example embodiment, such as a mobile phone or an in-car navigation apparatus. In other example embodiments, the apparatus 201 may comprise a module for a mobile phone (or PDA or audio/video player) or an in-car navigation apparatus, and may just comprise a suitably configured memory 207 and processor 208.

The example embodiment of FIG. 2 comprises a display device 204 such as, for example, a liquid crystal display (LCD), e-Ink or touch-screen user interface. The apparatus 201 of FIG. 2 is configured such that it may receive, include, and/or otherwise access data. For example, this example embodiment 201 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example embodiment comprises a memory 207 that stores data, possibly after being received via antenna 202 or port or after being generated at the user interface 205. The processor 208 may receive data from the user interface 205, from the memory 207, or from the communication unit 203. It will be appreciated that, in certain example embodiments, the display device 204 may incorporate the user interface 205. Regardless of the origin of the data, these data may be outputted to a user of apparatus 201 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
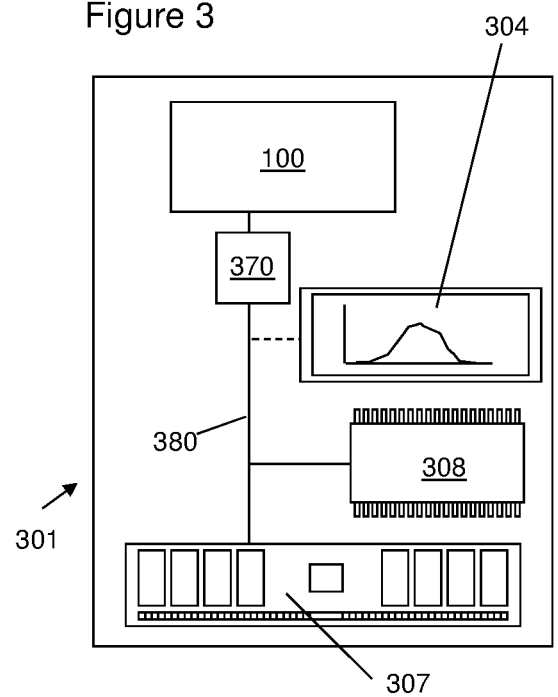
FIG. 3 illustrates an example apparatus embodiment comprising a number of electronic components, including memory and a processor, according to embodiments of the present disclosure.

FIG. 3 depicts a further example embodiment of an electronic device 301, such as a tablet personal computer, a portable electronic device, a portable telecommunications device, a server or a module for such a device, the device comprising the apparatus 101 of FIG. 1. The apparatus 101 can be provided as a module for device 301, or even as a processor/memory for the device 301 or a processor/memory for a module for such a device 301. The device 301 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 101 in FIG. 3 is connected (e.g. electrically and/or wirelessly) to an input/output interface 370 that receives the output from the apparatus 101 and transmits this to the device 301 via data bus 380. Interface 370 can be connected via the data bus 380 to a display 304 (touch-sensitive or otherwise) that provides information from the apparatus 101 to a user. Display 304 can be part of the device 301 or can be separate. The device 301 also comprises a processor 308 configured for general control of the apparatus 101 as well as the device 301 by providing signalling to, and receiving signalling from, other device components to manage their operation.

The storage medium 307 is configured to store computer code configured to perform, control or enable the operation of the apparatus 101. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Figure 4A:
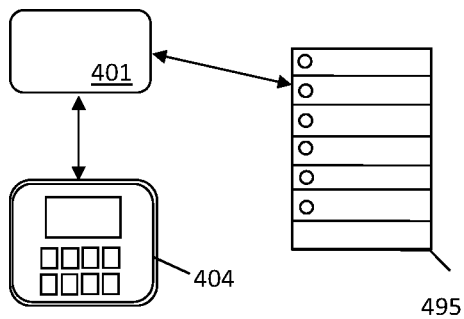
FIGS. 4a-4b illustrate an example apparatus in communication with a remote server/cloud.
Figure 4B:
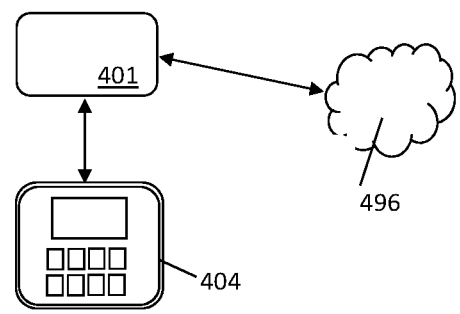

FIG. 4a shows that an example embodiment of an apparatus 401 in communication with a remote server 495. FIG. 4b shows that an example embodiment of an apparatus 401 in communication with a "cloud" 496 for cloud computing. In FIGS. 4a and 4b, apparatus 401 (which may be apparatus 101, 201 or 301) is in communication with a display 404. Of course, the apparatus 401 and display 404 may form part of the same apparatus/device, although they may be separate as shown in the figures. The apparatus 401 is also in communication with a remote computing element. Such communication may be via a communications unit, for example. FIG. 4a shows the remote computing element to be a remote server 495, with which the apparatus may be in wired or wireless communication (e.g. via the internet, Bluetooth, a USB connection, or any other suitable connection as known to one skilled in the art). In FIG. 4b, the apparatus 401 is in communication with a remote cloud 496 (which may, for example, by the Internet, or a system of remote computers configured for cloud computing). Some or all of the user applications and/or user content may be stored at the apparatus 101, 201, 301, 401. The apparatus 401 may actually form part of the remote server 495 or remote cloud 496. The functionality of determining the indication of one or more upload zones may be provided at the remote computing element 495, 496 or at the apparatus 401.

The aforementioned apparatus (101, 201, 301 and 401) are configured to perform one or more methods described herein.

In certain embodiments, the aforementioned apparatus are configured to generate an indication of one or more communication network receiver upload zones for a road data gatherer along a planned route to be traveled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data; and provide the indication to guide uploading of the road data gathered by the road data gatherer.

In certain embodiments, the aforementioned apparatus are configured to use the indication to guide the uploading of the road data gathered by the road data gatherer.

In certain embodiments, the aforementioned apparatus (or a plurality thereof) generate and provide multiple indications of upload zones for respective multiple road data gatherers.

In this way, the planned routes of road data gatherers can be used to drive/guide/dictate the allocation of upload zones (in which road data gatherers may upload road data) to road data gatherers. The upload of road data from road data gatherers can be scheduled to occur (or not occur) in particular upload zones in particular time periods. Network bandwidth can be allocated/distributed amongst multiple road data gatherers in order to better cope with the upload demands of the road data gatherers and the upload capabilities of the communication network receivers.

In one example embodiment, the indication may be provided as a data packet from a server 495 or cloud 496 to apparatus 401 (e.g. a portable device or navigation system). The apparatus may be associated with (e.g. located in) the road data gatherer for which the indication is being provided.

In another example embodiment, the indication may be provided as a data packet from apparatus 401 to a communication network receiver or the road data gatherer for which the indication is being provided.

In another example embodiment, the indication may be provided from apparatus 401 (e.g. a portable device or navigation system) to a user of the apparatus 401. The indication may be provided visually, audibly and/or in another way. The indication may be such that the details of a road segment (e.g. name of road) are provided to a user. The indication may be used to inform the user about the indicated upload zones and/or to prompt an action by the user. For example, user input may be required to allow or begin upload of road data. This may be to comply with privacy preferences of the user or legal requirements by establishing that the user is aware that data about his/her surroundings is being uploaded. In other embodiments, no user input is required to allow or begin upload of road data.

Figure 5A:
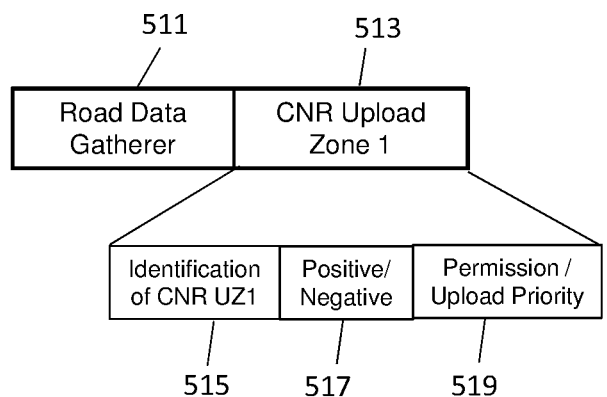
FIGS. 5a-5b illustrate schematically data packets comprising indication data.
Figure 5B:
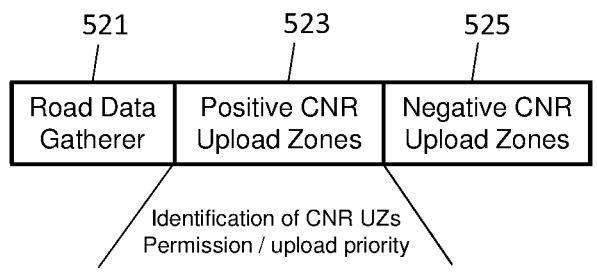

FIGS. 5a and 5b show example structures of the indication provided by the apparatus 101 according to the present invention. These are intended to be illustrative only, and other structures are within the scope of the invention.

The indication data packet shown in FIG. 5a comprises a 'Road Data Gatherer' portion 511, which identifies the road data gatherer for which the indication is being provided (e.g. by a unique identifier number/code), and a 'Communication Network Receiver (CNR) Upload Zone 1' portion 513. The data packet may comprise further 'CNR Upload Zone' portions if more than one upload zone is being indicated. Within the 'CNR Upload Zone 1' portion 513 are three sub-portions 515, 517, 519. Firstly, 'Identification of CNR Upload Zone 1' 515, which may identify at least one particular communication network receiver, geographic area and/or road segment or portion of road segment associated with upload zone 1. Secondly, a 'Positive/Negative' portion 517 which specifies whether a positive or negative indication is being provided for CNR upload zone 1, and thirdly a 'Permission/Upload Priority' portion 519 which specifies whether the indication relates to permission and/or an upload priority.

A different data packet structure is shown in FIG. 5b. This comprises a 'Road Data Gatherer' portion 521 (as in FIG. 5a), a 'Positive CNR Upload Zones' portion 523 and a 'Negative CNR Upload Zones' portion 525. The 'Positive CNR Upload Zones' portion 523 identifies the CNR upload zones for which a positive indication is being provided, and also identifies for each whether permission and/or an upload priority is being indicated. The 'Negative CNR Upload Zones' portion 525 similarly identifies negatively indicted upload zones. The 'Positive' and 'Negative CNR Upload Zones portions 523, 525 can each identify zero, one or more than one upload zones.

Of course, other features may be required in the indication data packet to allow transmission/provision of the indication. These are conventionally known and have not been described or represented in FIGS. 5a-5b. These features may include network addresses and other control information, for example in a header and trailer.

Figure 6:
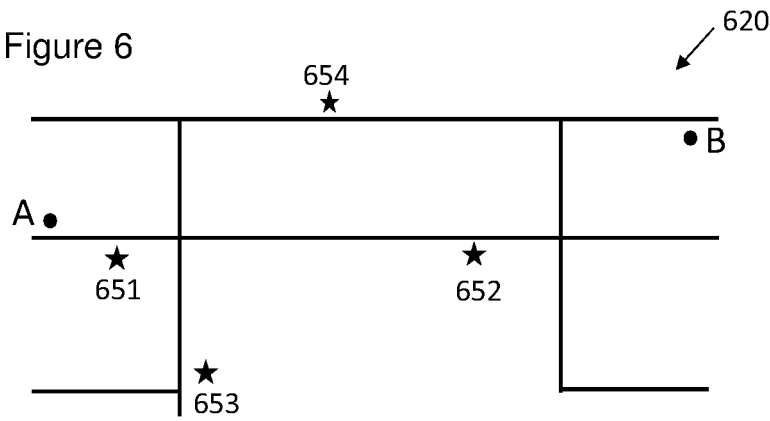
FIG. 6 illustrates schematically an example road network according to an embodiment of the present disclosure.

FIG. 6 shows an example road network 620, communication network receivers 651, 652, 653 and 654, and road data gatherers A and B. Each communication network receiver 651, 652, 653, 654 has an associated communication network receiver upload zone (not shown), which would be appreciated by the skilled person as a geographical region within the proximity of the receiver within which the receiver can be reached for communication.

In one embodiment, apparatus 401 (or 101, 201, 301) may generate and provide an indication of a communication network receiver upload zone for a road data gatherer A to specify a communication network receiver 651, 652, 653, 654 to be used by road data gatherer A for uploading of road data. The indication is determined according to a predetermined upload criterion which takes account of bandwidth capacities of communication network receivers along a planned route for road data gatherer A.

The indication of a communication network receiver upload zone for a road data gatherer is an indication for a particular time period/time slot, and the combination of an upload zone and a time period/time slot may be referred to as an upload slot. For example, apparatus 401 may provide an indication of a particular upload zone for the time period 7.00-7.04 am. The indication may explicitly specify a time period, or the time period may be implicit, i.e. not specified in the generated/provided indication. For example, if road data gatherer A is expected (based on a planned route) to be travelling through the upload zone at 7.02 am, the time period 7.00-7.04 am may be implicit in the indication of the upload zone. Alternatively, a shorter time period such as 7.01-7.03 am or a longer time period such as 6.57-7.07 am may be implied. In some embodiments, the time period is strictly followed. For example, if road data gatherer A arrives at the upload zone at 7.05 am (e.g. due to a traffic delay) it is not be able to upload gathered road data in the upload zone. In other embodiments, the time period may be less strictly followed.

The predetermined upload criterion used by the apparatus 401 requires use of received planned route data which allows the route to be traveled by a road data gatherer to be known. For example, the apparatus may receive a destination to be traveled to by a road data gatherer, and be configured to calculate a planned route based on the received destination. In other embodiments, the received planned route data may already indicate the planned route to be traveled for use by the apparatus 401 in the predetermined upload criterion. Of course, the received planned route and/or destination may or may not be received from the road data gatherer (so, in certain embodiments, a server or other apparatus which calculates the route for the route data gatherer may provide the planned route). In certain embodiments (as will be explained below in relation to FIG. 8, as an example), the apparatus may receive planned routes and/or destinations for multiple road data gatherers rather than just for the road data gatherer for which the indication is provided.

Furthermore, the predetermined upload criterion used by the apparatus 401 requires use of received information about bandwidth capacities of communication network receivers, specifically those communication network receivers along the planned route for the road data gatherer. This may relate to a bandwidth capacity of individual communication network receivers or to groups of communication network receivers (e.g. within a particular geographic area there may be X communication network receivers with a total bandwidth capacity of Y.) A bandwidth capacity of a communication network receiver may be an available bandwidth capacity of the communication network receiver. This may exclude a portion of the total bandwidth of the communication network receiver, such as bandwidth reserved or used for transmission/reception of critical road data or non-road data. Similarly, a bandwidth capacity of a group of communication network receivers may be an available bandwidth capacity of the group of communication network receivers.

In some embodiments, bandwidth capacity of a communication network receiver may be expressed as a number of 'upload sub-slots'. As discussed above, the combination of an upload zone and a time period may be referred to as an upload slot. In some embodiments, an upload slot may be 'divided' into 'upload sub-slots', each sub-slot having an associated amount/portion of bandwidth. For example, the upload slot of upload zone Z and time period 7.01-7.03 am may have a bandwidth capacity of 4B. This upload slot may be divided into four upload sub-slots, each with bandwidth capacity B (though bandwidth capacity need not be distributed equally amongst upload sub-slots), and the bandwidth capacity of a communication network receiver in upload zone Z (for time period 7.01-7.03 am) may be expressed as four upload sub-slots (each of bandwidth capacity B). The allocation of sub-slots to road data gatherers is described later in relation to FIG. 11.

An upload sub-slot may be considered as a 'bandwidth unit' or 'package' containing a particular amount of bandwidth for a particular upload slot, providing a convenient and efficient way of allocating bandwidth to road data gatherers. In some embodiments, the bandwidth capacity B of an upload sub-slot may correspond to the amount of data expected to be uploaded by one road data gatherer in upload zone Z (e.g. the amount of data expected to be gathered whilst travelling in upload zone Z or the amount of data expected to be gathered in the 5 minutes preceding the upload slot). The amount of data gathered by a road data gatherer per kilometer traveled is, in general, fairly constant/predictable which allows for fairly accurate estimates of the amount of data gathered. The apparatus 401 is configured to generate and provide the indication of one or more communication network receiver upload zones for a road data gatherer for use by one or more of the road data gatherer, a communication network receiver associated with an indicated upload zone, a server or module for one of the same, and a user of the apparatus. The provision of the indication may include internal provision of the indication within the apparatus prior to actual provision to the road data gatherer, the communication network receiver or a server or module for the same.

The apparatus may provide an indication of a communication network receiver upload zone by indicating an identification of one or more communication network receivers (e.g. a unique identifier number/code) associated with the communication network receiver upload zone. Alternatively or additionally, the apparatus may indicate one or more geographic areas (e.g. inner city, city centre, non-inner city, non-city centre, Nottingham, Nottinghamshire) and/or an identification of one or more road segments (e.g. names of road, or names of multiple roads) or portions of road segments (specific portions of roads, e.g. start, middle and/or end of a particular road or roads) associated with the communication network receiver upload zone.

It will be appreciated that the indicated geographic area, road segment or portion of road segment is associated with one or more communication network receivers, for example, a communication network receiver may be located along an indicated road segment or within an indicated geographic area. Multiple communication network receivers may be located within an indicated geographic area (or along an indicated road segment or portion of road segment). The apparatus may specify one or more particular communication network receivers of the multiple communication network receivers to be used by the road data gatherer for uploading of road data (e.g. by specifying the associated unique code for the receiver). Alternatively, the apparatus may not specify any specific communication network receivers, allowing the road data gatherer to upload to any of the multiple communication network receivers within the indicated area/road segment (or portion thereof).

Figure 7:
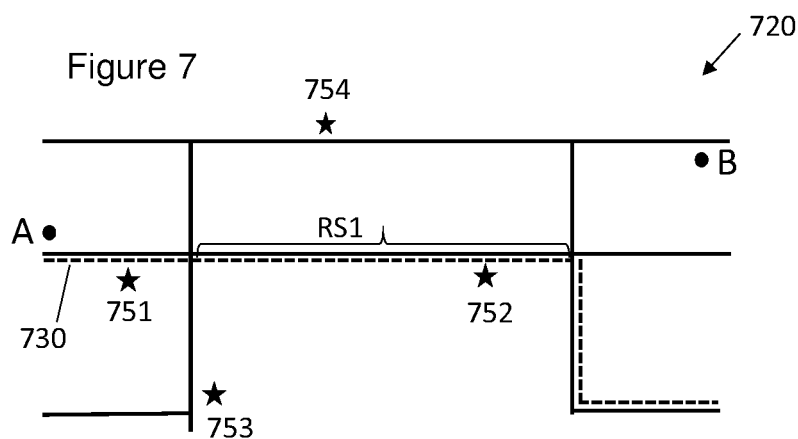
FIG. 7 illustrates schematically the example road network of FIG. 6 and a planned route of a road data gatherer.

FIG. 7 shows schematically the road network of FIG. 6 and a planned route 730 (dashed line) for road data gatherer A. In one embodiment, apparatus 401 is configured such that the predetermined upload criterion takes account of the (received) bandwidth capacities of communication network receivers 751 and 752 along planned route 730 independently of any planned routes of other road data gatherers. In other embodiments, the predetermined upload criterion may take account of the (received) bandwidth capacities of communication network receivers 751 and 752 along planned route 730 dependent on planned routes of other road data gatherers, e.g. road data gatherer B (as discussed in relation to FIG. 8). One aim of this upload criterion is, of course, to take account of respective bandwidth capacities to guide the uploading of road data to one or more of balance/distribute uploading across the receivers along the planned route and ideally (e.g. wherever or if possible) avoid network congestion at particular receivers and/or network timeouts.

The indication of one or more communication network receiver upload zones may be a positive indication or a negative indication. A positive indication may indicate permission for the road data gatherer to upload gathered road data to a communication network receiver associated with the upload zone. For example, apparatus 401 may indicate that road data gatherer A is permitted to upload road data to communication network receivers 751 and 752 (as per FIG. 5, for example).

Alternatively or additionally, a positive indication may indicate an upload priority for road data gathered by the road data gatherer in respect of a permitted communication network receiver. The upload priority may prioritise one or more of one aspect of the gathered road data (discussed further below) and one road data gatherer over another road data gatherer (discussed further below).

A negative indication may indicate denial of permission for the road data gatherer to upload gathered road data to a communication network receiver associated with the upload zone.

For example, apparatus 401 may indicate that road data gatherer A is not permitted to upload road data to communication network receiver 752 (as per FIG. 5, for example).

Alternatively or additionally, a negative indication may indicate an upload priority for road data gathered by the road data gatherer in respect of a permitted communication network receiver, the upload priority de-prioritising one or more of one aspect of the gathered road data and one road data gatherer over another road data gatherer (discussed further below).

In the absence of a specific positive or negative indication, a road data gatherer or a communication network receiver may be configured to infer permission or denial of permission for the road data gatherer to upload gathered road data to the particular non-indicated communication network receiver, based on the provided indication of one or more upload zones. For example, based on a positive indication for road data gatherer A of communication network receivers 751, road data gatherer A and/or one or more of communication network receivers 752, 753 and 754 may infer than road data gatherer A is denied permission to upload road data to one or more of communication network receivers 752, 753 and 754. Conversely, based on a negative indication for road data gatherer A of communication network receiver 752, road data gatherer A and/or one of more of communication network receivers 751, 753 and 754 may infer that road data gatherer A is permitted to upload road data to one or more of communication network receivers 751, 753 and 754.

A road data gatherer or communication network receiver may also be configured to infer permission or denial of permission for a particular time period. For example, based on a positive indication for road data gatherer A of communication network receiver 751 for the time period 7.00-7.04, road data gatherer A and/or communication network receiver 751 may infer that road data gatherer A is not permitted to upload road data to communication network receiver 751 before 7.00 or after 7.04. Alternatively, they may infer that road data gatherer A is permitted to upload in the 5 minute periods before and after 7.00-7.04 but with a lower priority than other road data gatherers. Other inferences could of course be envisaged.

In one embodiment, communication network receivers 753 and 754 are not taken into account because they are not considered to be strictly along the planned route 730 of road data gatherer A. However, in other embodiments, communication network receivers 753 and 754 may be considered to be along planned route 730 (e.g. they are within a certain distance of planned route 730, or within a geographic area through which planned route 730 passes) and may be taken into account by the predetermined upload criterion as the gatherers would pass within the respective upload zones whilst travelling on the planned route.

The apparatus may be configured such that the predetermined upload criterion takes account of other factors as well as bandwidth capacities of communication network receivers along planned route 730. In one embodiment, the volume of data expected to be uploaded by road data gatherer A is considered. For example, a large volume of data may be expected to be gathered, and to be uploaded, on road segment RS1. It may be preferable to upload gathered road data to communication network receiver 751, which is before road segment RS1 on road data gatherer A's planned route 730, to reduce the amount of road data to be uploaded on/after road segment RS1. This may be because the receiver 751 is expected or is known to have a good bandwidth capacity and/or just to reduce the burden on any subsequent receiver. In other embodiments, it may be preferable to upload gathered road data to communication network receiver 752, which is on/associated with road segment RS1, rather than receiver 751, because of bandwidth constraints on receiver 751. Accordingly, the predetermined upload criterion is appropriately adapted to take account of the respective bandwidth capacities along the planned route.

In another embodiment, an upload compatibility of road data gatherer A and the communication network receivers may be considered. An upload compatibility may be a technical compatibility. For example, road data gatherer A may be technically compatible with and able to upload road data to a particular communication network receiver, but technically incompatible with a different particular communication network receiver. The predefined upload criterion may be such that technically incompatible communication network receivers are not specified for road data gatherer A. Examples of technical incompatibilities may include receivers to which the road data gatherer is not subscribed and/or receivers which operate to a different network protocol (e.g. 3G, 4G, 5G, WiFi etc.) to which the road data gatherer is configured. In further embodiments, the bandwidth capacities which the predetermined criterion considers may only relate to technically compatible networks/gatherers.

In another embodiment, upload compatibility may relate to an upload cost. There may be an upload cost associated with uploading road data from road data gatherer A to a particular communications network receiver. This cost may express a 'preferability' of uploading to a particular communications network receiver. For example, there may be a higher cost associated with uploading road data to a communications network receiver located on a busy road segment to make this a less preferable communications network receiver. The cost may also relate to receivers to which the gatherer has a subscribed/not subscribed. The upload compatibility may, in some embodiments, exclude such costs from consideration.

Figure 8:
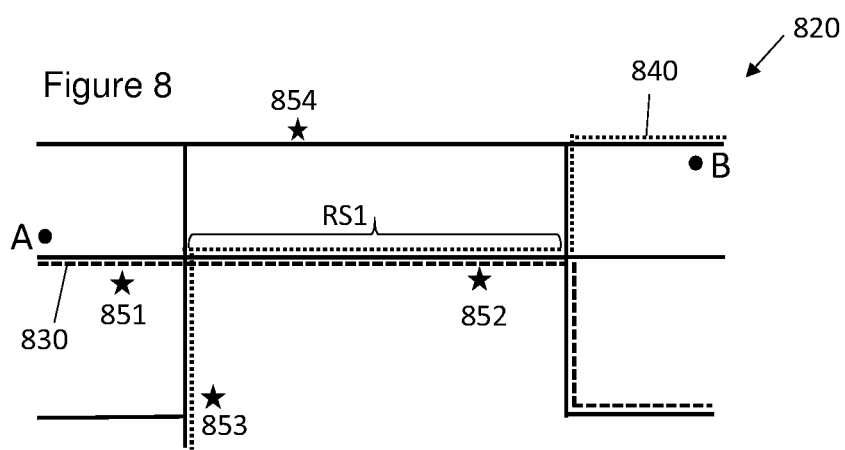
FIG. 8 illustrates schematically the example road network of FIG. 6 and planned routes of two road data gatherers.

FIG. 8 shows schematically a planned route 830 (dashed line) for road data gatherer A and a planned route 840 (dotted line) for road data gatherer B. Planned routes 830 and 840 coincide at road segment RS1. Road data gatherers A and B may be expected to both be travelling on road segment RS1 at a particular time, and to both be in proximity of communication network receiver 852 at a particular time.

In this embodiment, apparatus 401 is configured to provide an indication of one or more communication network receiver upload zones for road data gatherer A along planned route 830, the indication determined according to a predetermined upload criterion which takes account of the bandwidth capacities of communication network receivers 851 and 852 along planned route 830 dependent on planned route 840 of road data gatherer B. Various aspects relating to the planned routes 830 and/or 840 may be considered, as discussed below (and also as previously discussed in relation to FIG. 7).

The entire planned route 840 may be considered (rather than only the portion along road segment RS1 which is coincident with/proximal to planned route 830), or a smaller portion of planned route 840 may be considered. This may include portions of planned route 840 preceding and/or following the coincident/proximal portion RS1.

The apparatus may also be configured to provide an indication of one or more communication network receiver upload zones for road data gatherer B along planned route 840, the indication determined according to a predetermined upload criterion which takes account of the bandwidth capacities of communication network receivers along planned route 840, to specify communication network receivers to be used by road data gatherer B for uploading of road data. This may be independent of or dependent on the planned route 830 of road data gatherer A. Again, various aspects relating to the planned routes 830 and/or 840 may be considered.

As discussed above, the indication(s) may be positive (indicating permission or a prioritising upload priority) or negative (indicating denial of permission or a de-prioritising upload priority). A prioritising or de-prioritising upload priority may prioritise or deprioritise one road data gatherer over another road data gatherer. For example, in order to prioritise road data gatherer A over road data gatherer B with respect to uploading road data to communication network receiver 852, apparatus 401 may provide a positive upload priority indication for road data gatherer A and/or a negative upload priority indication for road data gatherer B. Alternatively, apparatus 401 may provide positive indications for both road data gatherers A and B with the indication for A being 'more positive' than for B (e.g. A: 'first in priority queue to upload data', B: 'second in priority queue to upload data').

Accordingly, the apparatus 401 is configured such that the predetermined upload criterion for a particular road data gatherer considers the expected proximity of multiple road data gatherers to a particular communication network receiver at a particular time. For example, if the particular road data gatherer is expected to be in proximity to a particular communication network receiver at a particular time (based on its planned route), the predetermined upload criterion may consider if any other road data gatherers are also expected to be in proximity of the particular communication network receiver at the particular time. A road data gatherer that is expected to be proximal to the particular road data gatherer and a particular communication network at a particular time may be considered to satisfy a 'proximity criterion'. In one embodiment, the predetermined upload criterion may take account of planned routes of other road data gatherers which satisfy the proximity criterion, and may not take account of planned routes of other road data gatherers which do not satisfy the proximity criterion. In the embodiment of FIG. 8, road data gatherers A and B may be expected to be 'proximal' to each other and to communication network receiver 852 because their planned routes coincide on road segment RS1 (at a particular time), but it will be understood that two road data gatherers do not need to be on the same road segment to both be proximal to each other and to a particular communication network receiver. They could, for example, be within a particular geographic area or within a predetermined distance of each other.

As mentioned above, the predetermined upload criterion for road data gatherer A and/or B may take account of various aspects relating to the planned routes 830 and/or 840 of road data gatherers A and/or B.

For example, the predetermined upload criterion may take account of a number of road data gatherers expected to be in proximity of a communications network receiver at a particular time based on the planned routes of the respective road data gatherers. 'Busier' communication network receivers, i.e. those with a higher number of road data gatherers expected to be in proximity thereof at a particular time, may be less likely to be positively indicated for a road data gatherer than 'less busy' communication network receivers. For example, communication network receiver 852 may be considered 'busier' than communication network receiver 851 due to the expected proximity of road data gatherer B to communication network receiver 852, and so communication network receiver 851 may be more likely to be positively indicated for road data gatherer A. Of course, other indications, combinations of indications and inferred indications are possible in these embodiments and in other embodiments.

Alternatively or additionally, the predetermined upload criterion may take account of bandwidth capacities of communication network receivers along respective planned routes of one or more other road data gatherers. For example, it may take account of the bandwidth capacity of communication network receiver 853, which is along the planned route 840 of road data gatherer B. In one example embodiment, communication network receiver 853 may have a very low bandwidth capacity. Accordingly, in order to allow road data gatherer B to upload road data to higher-bandwidth capacity communication network receiver 852, the apparatus may provide a positive indication of communication network receiver 852 for road data gatherer B (e.g. permission to upload, or a prioritisation over other road data gatherers) and/or a negative indication of communication network receiver 852 for road data gatherer A (e.g. denial of permission to upload or a de-prioritisation over other road data gatherers). Of course, other indications, combinations of indications and inferred indications are possible in these embodiments and in other embodiments.

Alternatively or additionally, the predetermined upload criterion may take account of a volume of data expected to be uploaded by one or more other more other road data gatherers travelling along respective planned routes. In one example embodiment, a large volume of data may be expected to be gathered by road data gatherer B during a portion of its route preceding road segment RS1, and so a large volume of data might be expected to be uploaded by road data gatherer B to communication network receiver 852. Accordingly, in order to allow road data gatherer B to upload the large volume of data to communication network receiver 852, the apparatus may provide a positive indication of communication network receiver 852 for road data gatherer B (e.g. permission to upload, or a prioritisation over other road data gatherers) and/or a negative indication of communication network receiver 852 for road data gatherer A (e.g. denial of permission to upload or a de-prioritisation over other road data gatherers).

In another example embodiment, a large volume of data may be expected to be gathered by road data gatherer A during a portion of its route following road segment RS1. It may be preferable for road data gatherer A to upload gathered road data to communication network receiver 852 on road segment RS1, i.e. before reaching the large volume-portion of the route. Accordingly, the apparatus may provide a positive indication of communication network receiver 852 for road data gatherer A (e.g. permission to upload, or a prioritisation over other road data gatherers) and/or a negative indication of communication network receiver 852 for road data gatherer B (e.g. denial of permission to upload or a de-prioritisation over other road data gatherers). Of course, other indications, combinations of indications and inferred indications are possible in these embodiments and in other embodiments.

As discussed previously in relation to FIG. 7, the predetermined upload criterion may also take account of the volume of data expected to be uploaded by the particular road data gatherer and/or and upload compatibility with a communication network receiver. Any combination of factors discussed herein is also disclosed.

Although the above embodiments take into account the planned routes of only road data gatherers A and B, it will be understood that the planned routes of even more multiple road data gatherers could be considered (and that various aspects relating to these multiple planned routes could be considered). An example is discussed below, in relation to FIG. 10, involving 10 road data gatherers RDG1-RDG10, and it will be understood that the indications generated/provided for each of these 10 road data gatherers may take into account each of the 10 planned routes.

The planned route of a road data gatherer may change, either in advance of the road data gatherer travelling on the planned route or whilst the road data gatherer is travelling on the planned route. For example, the planned route may change due to roadworks, road closures, diversions, traffic conditions, a slower/faster driving speed than expected, a driver/operator choice or a driver/operator/vehicle error such as taking an incorrect turning.

A 'change' of planned route may mean that the road segments making up the planned route change, or that the times at which a road data gatherer is expected to reach particular road segments of the planned route change.

Due to a change in its planned route, a road data gatherer may miss an indicated upload zone and time period in which to upload its gathered road data. Apparatus 401 may be configured to update the indicated communication network receiver upload zones for the road data gatherer. The update may specify a new communication network receiver upload zone and/or specify or imply a new time period. This update may be automatic (once the indicated upload zone/time period has been missed or is expected to be missed) or the road data gatherer may request an updated upload zone. In some embodiments, the road data gatherer may simply wait until it reaches a next indicated upload zone to upload the data, or may independently decide to upload data to a communication network receiver regardless of the indication, or may decide not to upload that particular data at all (e.g. if the data will have become outdated or redundant by the time that the road data gatherer would be able to upload the data).

The apparatus may be configured to update the indicated communication network receiver upload zones to account for changes in planned route, including 'real-time' or 'live' changes in planned route whilst the road data gatherer is travelling on the planned route.

This may allow bandwidth to be allocated and re-allocated to road data gatherers based on current uploading requirements of road data gatherers.

As shown in FIG. 9, road data gatherer B may deviate from the planned route by carrying straight on rather than turning left. This may, for example, be a driver choice to avoid busy road segment RS1. The planned route for road data gatherer B is updated based on the deviation from the planned route. The apparatus may calculate an updated planned route 945 or may receive information about a new planned route 945. The apparatus may have provided an indication of communication network receiver upload zones for road data gatherer B based on the planned route. The apparatus may be configured to update the indication for road data gatherer B based on the update to the planned route for road data gatherer B. For example, the updated planned route 945 now passes communication network receiver 954 and does not pass communication network receiver 952. The updated indication for road data gatherer B may indicate communication network receiver 954 (e.g. a positive indication). As previously discussed, this indication may take into account B's route only, or may also take into account the planned route of road gatherer A or of any other road data gatherer on the road network.

Of course, the apparatus may also be configured to provide an updated indication of communication network receiver upload zones for road data gatherer A based on the updated planned route for road data gatherer B.

Alternatively or in addition, the apparatus may be configured to provide an updated indication based on a change in bandwidth capacity of a communication network receiver along a planned route of a road data gatherer. This may allow bandwidth to be allocated and re-allocated to road data gatherers based on current uploading capabilities of communication network receivers. For example, more bandwidth capacity may be required for transmission of critical road data or of non-road data, or less bandwidth may be available due to a technical fault. For example, if a road traffic accident occurs on road segment RS1, more bandwidth of network communication receiver 952 may be required for critical road data or non-road data, and the apparatus may be configured to provide a negative indication of communication network receiver 952 upload zone for road data gatherer A.

Such dynamic updating may include updates relating to the amount of road data gathered by the road data gatherer or by a road data gatherer in proximity to the road data gatherer. Thus the amount of road data gathered by respective road data gatherers which are travelling on the planned routes may be fed back to allow dynamic management of network receiver resources.

Various types of road data may be gathered/obtained by road data gatherers, such as road data relating to current weather conditions, environmental conditions, road conditions, road obstructions, peripheral scenery, objects in a line of sight, new buildings along a road, new objects along a road, and moving objects on or along a road, for example.

Different types of gathered data may be categorised as operational data or non-operational data. Operational data is data that is required for a road data gatherer to follow its planned route, and is related to upcoming manoeuvres of the road data gatherer. Examples include the distance to a vehicle in front of the road data gatherer, the speed of the vehicle in front, and information about a pedestrian walking on a road in front of the road data gatherer.

Without operational data, the road data gatherer may, for example, slow down, stop or take a wrong turning. Non-operational data does not affect the operation of the road data gatherer and is not required for the road data gatherer to follow its planned route. Examples include data relating to a new building at the side of the road or a tree branch located on a perpendicular or parallel road. This data may be relevant for other types of vehicles, or vehicles travelling on different roads (e.g. parallel or perpendicular roads). This data can also be used to update map data, such as a digital map database.

Different types (or sub-types) of road data may have different priority or importance levels. In one example embodiment, data is categorised as 'high importance', 'medium importance' or 'low importance'. The 'high', 'medium' and 'low importance' categories may or may not be similar to 'operational data' and 'non-operational data' categories. In one embodiment, all 'high importance' data may be operational data, and all 'low importance' data may be non-operational data, with 'medium importance' data comprising both operational and non-operational data.

High importance road data may be data that may be very relevant to road users, such as hazardous weather conditions (e.g. icy roads) or road conditions (e.g. obstruction on road). Medium importance road data may be data that may be relevant to road users, such as non-hazardous weather conditions (e.g. rain), traffic conditions or roadside conditions (e.g. object at side of road). Low importance road data may be data that is not directly relevant to road users, such as peripheral scenery (e.g. images of buildings at the side of a road).

Road data gatherers may upload road data of different importance levels in different ways. In one embodiment, high importance road data may be uploaded in any communication network receiver upload zone. That is, specific permission to upload high importance road data in a particular upload zone is not required. The positive and negative indications of the present disclosure may relate to medium importance and/or low importance road data and not to high importance road data. Alternatively, the indications may relate to all types of road data gathered by the road data gatherers.

Road data gatherers may use various types of sensors/cameras/detectors to obtain road data, which may use one or more of infrared, LiDAR, short range RADAR, long range RADAR, ultrasound and optical sensing. Sensors/cameras/detectors may be positioned at various places on a road data gatherer, e.g. front, back, side, and/or may be integrated into the road data gatherer. In some embodiments, they can be deployed from a road data gatherer, for example with an airborne drone.

As mentioned above, a positive indication of an upload zone may indicate permission to upload and/or an upload priority that prioritises one aspect of road data. In one embodiment, this may indicate permission to upload road data of a particular importance level(s) in the upload zone. For example, a positive indication may indicate permission to upload medium importance road data in the upload zone.

Similar concepts apply to a negative indication that deprioritises one aspect of road data.

Alternatively, an upload priority that prioritises one aspect of road data may be implicit (rather than explicit) in the positive indication. For example, it may be understood that permission to upload road data in an upload zone relates to certain types/importance levels of road data only.

FIG. 10 shows schematically an example road network 1020 comprising 10 road segments (RS1-RS10) and 5 communication network receivers (CNR1-CNR5). 10 road data gatherers (RDG1-RDG10) (not shown) are travelling on road network 1020.

An example will be described in relation to FIG. 10 to illustrate (i) the aggregation of planned routes of multiple road data gatherers and communication network receiver upload zones and (ii) the allocation of upload zones/time periods based on the planned routes of road data gatherers RDG1-RDG10. Other methods for allocating upload zones/time periods can be envisaged. The aggregation step may be performed by apparatus 401, by another apparatus or system. Similarly, the allocation step may be performed by apparatus 401, by another apparatus (e.g. a communication network receiver) or system. For simplicity, in the following example they are performed by apparatus 401.

Generating (for provision) an indication of one or more upload zones for a road data gatherer may be part of the allocation of upload zones process/step, or may occur after the allocation of upload zones. As mentioned above, in some embodiments, the same apparatus/system performs the allocation and generating steps. For example, an apparatus may allocate upload zones/time slots to multiple road data gatherers based on the aggregated planned routes and upload zones, and then generate respective indications for the multiple road data gatherers. In other embodiments, different apparatus/systems perform the allocation and generating steps. For example, a first apparatus may allocate upload zones/time slots to a road data gatherer and a second apparatus may generate and provide the indication (e.g. to a user).

The allocation of an upload zone for a road data gatherer takes into account of the bandwidth capacities of communication network receivers along the planned route for the road data gatherer, and optionally other factors (as previously discussed).

Table 1 shows the planned routes for each of road data gatherers RDG1-RDG10 on road network 1020 and the associated set off times.

TABLE 1 planned routes for road data gatherers RDG1-RDG10.

| Road data gatherer | Planned route | Set off time |
| --- | --- | --- |
| RDG 1 | RS1, RS2, RS3 | 7.00 |
| RDG 2 | RS5, RS2, RS6 | 7.05 |
| RDG 3 | RS1, RS2, RS3, RS4 | 7.15 |
| RDG 4 | RS1, RS5 | 7.10 |
| RDG 5 | RS1, RS2, RS3, RS8, RS9 | 7.05 |
| RDG 6 | RS10, RS8, RS3, RS2 | 7.10 |
| RDG 7 | RS1, RS2, RS3, RS4 | 7.10 |
| RDG 8 | RS7, RS3, RS2, RS1 | 7.10 |
| RDG 9 | RS5, RS2, RS3, RS7 | 7.05 |
| RDG 10 | RS4, RS3, RS2, RS1 | 7.15 |

Based on the planned routes and set off times of the road data gatherers RDG1-RDG10 and the traversal times of the road segments RS1-RS10, apparatus 401 can determine which road data gatherers RDG1-RDG10 are expected to be travelling on each road segment RS1-RS10 at each of times T1 (7.00)-T7 (7.30), as shown in Table 2.

For simplicity, each of road segments RS1-RS10 takes five minutes to be traversed. In reality of course, different road segments take different amounts of time to traverse, depending on distances, traffic conditions, weather conditions. Additionally, a particular road segment may take different amounts of time to traverse at different times (e.g. due to different traffic or weather conditions) and an average time (e.g. an overall average time, an average time at 8.30 am or 10 am, an average icy conditions time) may be used for upload zone/time period allocation purposes.

TABLE 2 road data gatherers on each of road segments RS1-RS10 at times T1-T7.

| | TIME | | | | | | |
| --- | --- | --- | --- | --- | --- | --- | --- |
| RS# | T1 = 7.00 | T2 = 7.05 | T3 = 7.10 | T4 = 7.15 | T5 = 7.20 | T6 = 7.25 | T7 = 7.30 |
| RS 1 | RDG 1 | RDG 5 | RDGs 4, 7 | RDG 3 | | RDG 8 | RDG 10 |
| RS 2 | | RDG 1 | RDGs 2, 5, 9 | RDG 7 | RDGs 3, 8 | RDGs 6, 10 | |
| RS 3 | | | RDG 1 | RDGs 5, 8, 9 | RDG 6, 7, 10 | RDG 3 | |
| RS 4 | | | | RDG 10 | | RDG 7 | RDG 3 |
| RS 5 | | RDGs 2, 9 | | RDG 4 | | | |
| RS 6 | | | | RDG 2 | | | |
| RS 7 | | | RDG 8 | | RDG 9 | | |
| RS 8 | | | | RDG 6 | RDG 5 | | |
| RS 9 | | | | | | | RDG 5 |
| RS 10 | | | RDG 6 | | | | |

This example involves 10 road segments, 10 road data gatherers and 5 communication network receivers, but it will be understood that the following principles may be used to handle larger and changing numbers of road segments, road data gatherers and communication network receivers, as well as changing planned routes. Additionally, numerous simplifying assumptions have been made to allow a clearer explanation, but it will be understood that the following principles may be used without these assumptions.

Table 3 lists the road segments which are located within the upload zones of each of communication network receivers CNR1-CNR5. For example, road segments RS1 and RS5 are located within the upload zone for communication network receiver CNR1. Therefore road data gatherers on road segments RS1 or RS5 may be able to upload road data to communication network receiver CNR1.

TABLE 3 road segments located in upload zones for CNR1-CNR5.

| CNR # | RS # |
|---|---|
| CNR 1 | RS 1, RS 5 |
| CNR 2 | RS 2, RS 6 |
| CNR 3 | RS 3 |
| CNR 4 | RS 4, RS 7 |
| CNR 5 | RS 8, RS 9, RS 10 |

Based on the information in Table 2 and Table 3, apparatus 401 can therefore determine which road data gatherers is expected to be located in each of the communication network receiver upload zones CNR1-CNR5 at each of times T1-T7, as shown in Table 4.

TABLE 4 road data gatherers in communication network receiver upload zones at times T1-T7.

| | TIME | | | | | | |
|---|---|---|---|---|---|---|---|
| CNR# | T1 = 7.00 | T2 = 7.05 | T3 = 7.10 | T4 = 7.15 | T5 = 7.20 | T6 = 7.25 | T7 = 7.30 |
| CNR 1 | RDG 1 | RDGs 2, 5, 9 | RDGs 4, 7 | RDGs 3, 4 | | RDG 8 | RDG 10 |
| CNR 2 | | RDG 1 | RDGs 2, 5, 9 | RDGs 2, 7 | RDGs 3, 8 | RDG 6, 10 | |
| CNR 3 | | | RDG 1 | RDGs 5, 8, 9 | RDGs 6, 7, 10 | RDG 3 | |
| CNR 4 | | | RDG 8 | RDG 10 | RDG 9 | RDG 7 | RDG 3 |
| CNR 5 | | | RDG 6 | RDG 6 | RDG 5 | RDG 5 | |

Apparatus 401 can then allocate upload zones/time periods to road data gatherers RDG1-RDG10 based on their location within the upload zones at times T1-T7. As mentioned, allocation of upload zones/time periods may include generating the indication of one or more upload zones for a road data gatherer. As previously discussed, this takes account of the bandwidth capacities of communication network receivers along the planned route for each road data gatherer RDG1-RDG10, and optionally other factors (also as previously discussed).

As an example, consider the CNR2 upload zone at time T3=7.10. Apparatus 401 may allocate the CNR2 upload zone for T3=7.10 to at least one of the road data gatherers expected to be within the upload zone (RDG2, RDG5 and RDG9). There may be sufficient bandwidth capacity to allow all three road data gatherers to upload high, medium and low importance data. Each road data gatherer may be allocated an equal (or unequal) share of the available bandwidth. Alternatively, communication network receiver CNR2 may not have sufficient bandwidth to allow this. Apparatus 401 may, for example, allocate the CNR2 upload zone to all three of RDG2, RDG5 and RDG9 for high importance data only, or to RDG2 and RDG9 for high and medium importance data, or to RDG2 only for high, medium and low importance data, or another combination. Various factors (as previously discussed) may be considered in this allocation. For example, apparatus 401 may note that RDG2 is near the end of its planned route and that RDG5 and RDG9 are expected to respectively be the only road data gatherers in the CNR5 and CNR4 upload zones at time T5=7.20 (and also T6=7.25 for RDG5), therefore it may prefer to allocate the CNR2 upload zone to RDG2.

It will be understood that these principles may be applied to larger and changing numbers/amounts/combinations of road segments, road data gatherers, planned routes, communication network receivers, time periods, available bandwidth and gathered road data. Regardless of the size and complexity of the road network system, the allocation of particular upload zones/time periods to particular road data gatherers allows for efficient bandwidth planning.

FIG. 11 illustrates schematically road segments RS1 and RS2 of a road network, communication network receivers CNR1 and CNR2, and road data gatherers RDG1-RDG4 at time T=0 and time T=1. At time T=0, RDG1, RDG2, RDG3 and RDG4 are all located on road segment RS1. At time T=1, RDG1, RDG2 and RDG3 are located on road segment RS2, and RDG4 is no longer on this portion of the road network. These positions may be expected positions based on planned routes for road data gatherers RDG1-RDG4 on the road network. Road segments RS1 and RS2 are within the upload zones for communication network receivers CNR1 and CNR2 respectively.

An example will be described in relation to FIG. 11 to illustrate the allocation of bandwidth to road data gatherers.

As mentioned above, generating an indication of one more upload zones for a road data gatherer may be part of the allocation process/step or may occur after allocation. In this example, communication network receiver CNR1 has a bandwidth capacity of three upload sub-slots, where the bandwidth associated with each sub-slot is sufficient to allow one road data gatherer to upload road data for road segment RS1 (i.e. the bandwidth capacity allows three road data gatherers to upload road data for road segment RS1). Communication network receiver CNR2 has a bandwidth capacity of five upload sub-slots, where the bandwidth associated with each sub-slot is sufficient to allow one road data gatherer to upload road data for road segment RS2 (i.e. the bandwidth capacity allows five road data gatherers to upload road data for road segment RS2).

At time T=0, there are four road data gatherers on road segment RS1, each gathering data about road segment RS1. Communication network receiver CNR1 does not have sufficient bandwidth capacity to allow all four road data gatherers to upload data for road segment RS1. In one embodiment, the three upload sub-slots for CNR1 are allocated to and indicated for RDG2, RDG3 and RDG4 respectively, but not to/for RDG1. This is based on the planned routes and optionally any other factors as previously discussed. RDG2, RDG3 and RDG4 can therefore upload collected road data for RS1. RDG1 either (i) temporarily stores the data for RS1 for upload at a later time, or (ii) discards the data (e.g. it may be considered redundant for four road data gatherers to upload data for the same road segment).

At T=1, RDG1, RDG2 and RDG3 are located on road segment RS2, each gathering data about road segment RS2. RDG4 has left this portion of the road network. Communication network receiver CNR2 has sufficient bandwidth capacity to allow each of RDG1, RDG2 and RDG3 to upload road data for road segment RS2, and so each road data gatherer is allocated one of the five upload sub-slots for CNR2. CNR2 also has spare bandwidth capacity (two upload sub-slots) to allow RDG1 to upload gathered road data for road segment RS1, and so RDG1 may be allocated at least one additional upload sub-slot.

In some embodiments, a road data gatherer may 'pace itself' (e.g. travel at a faster or slower speed on at least some portion of its planned route) to allow upload (or better upload) of road data. For example, a road data gatherer may travel at a lower speed than planned to allow it to stay in range of a communication network receiver (i.e. within an upload zone) for longer. This may, for example, enable it to complete an upload of data to the communication network receiver before leaving the upload zone, or to have an improved connection with the communication network receiver. Alternatively, a road data gatherer may travel at a slower speed to avoid missing its upload slot by reaching an indicated upload zone before the associated time period, and possibly not being able to upload road data in the indicated upload zone. Conversely, the road data gatherer may travel at a higher speed than planned to allow it to reach an upload zone in time to upload data in the time period. The road data gatherer (or a driver thereof) may be instructed to alter its speed from a planned speed (e.g. as part of or with the indication of one or more upload zones) or may determine so independently. Of course, the speed alterations are to be done only when safe and in a manner that does not become uncomfortable to occupants of the road data gatherer and/or to other road users.

In certain embodiments, if it is determined that there are no communication network receivers directly on planned route, but some are close to the route, the indication could allow provision of information which could alter the planned route (e.g. to a predetermined degree, such as with a detour of less than 100 meters, for example) to pass by a communication network receiver. Similarly, if a receiver of better bandwidth capacity receiver for the overall system to operate efficiently is within a specified detour (e.g. 1 mile), the indication could allow alteration of the planned route to give the option to alter the route (or actually alter the planned route). This could also improve allocation of bandwidth/allow uploading of data.

As previously mentioned, the use of an indication to guide uploading can make the uploading of gathered road data more efficient and can help to reduce bandwidth congestion in network receivers along a planned route. Dependent upon the strictness of the protocols which are adopted, the indication could further control the uploading so it could be considered to dictate the uploading in a strictly adopted protocol. In contrast, in a not-so-strictly adopted protocol, the guide could be a preference indication which does not necessarily need to be followed (there is flexibility which may take account of other higher priority factors).

The communication network receivers may perform other functions, as well as receiving road data which is uploaded by road data gatherers. For example, a communication network receiver may 'advertise' its availability for the uploading of road data by road data gatherers.

A communication network receiver may upload received road data to the cloud 496 and/or a remote server 495, where road data from multiple communication network receivers may be aggregated. The communication network receiver may perform deduplication on road data uploaded by different road data gatherers to reduce the amount of redundant data which is uploaded to the cloud/remote server (e.g. may upload only 1 of 3 received sets of data relating to a new building along a road segment), reducing the cloud/remote server load. Other types of processing can be provided at communication network receivers (the 'edges' of the network). This may allow data to be communicated (for example between road data gatherers, or to other road vehicles) with a much lower latency as the data does not need to be transmitted to the cloud and back. These can be considered as forms of edge computing.

FIG. 12 illustrates schematically the main steps 1260, 1270 of the method described herein. The method generally comprises: generating 1260 an indication of one or more communication network receiver upload zones for a road data gatherer along a planned route to be traveled by the road data gatherer, the indication determined according to a predetermined upload criterion, which takes account of the bandwidth capacities of communication network receivers along the planned route for the road data gatherer, to specify communication network receivers to be used by the road data gatherer for uploading of road data; and providing 1270 the indication to guide uploading of the road data gathered by the road data gatherer.

FIG. 13 illustrates schematically a computer/processor readable medium 1370 providing a computer program according to one embodiment. The computer program may comprise computer code configured to perform, control or enable one or more of the method steps 1260 of FIG. 6. In this example, the computer/processor readable medium 1370 is a disc such as a digital versatile disc (DVD) or a compact disc (CD). In other embodiments, the computer/processor readable medium 1370 may be any medium that has been programmed in such a way as to carry out an inventive function. The computer/processor readable medium 1370 may be a removable memory device such as a memory stick or memory card (SD, mini SD, micro SD or nano SD).

Other embodiments depicted in the figures have been provided with reference numerals that correspond to similar features of earlier described embodiments. For example, feature number 1 can also correspond to numbers 101, 201, 301, 401 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising a processor and memory including computer program code, the memory and computer program code configured to, with the processor, enable the apparatus at least to:
   calculate a planned route to be travelled by a road data gatherer based on a received destination for a road data gatherer;
   generate an indication of one or more communication network receiver upload zones along the planned route for the road data gatherer for one or more respective time periods, the indication being determined according to a predetermined upload criterion, that takes account of received information about available bandwidth capacities of communication network receivers at the one or more respective time periods along the planned route, so that the indication specifies communication network receivers to be used or not used by the road data gatherer to upload road data in the one or more respective time periods; and
   provide the indication to guide uploading of the road data gathered by the road data gatherer.

2. The apparatus of claim 1, wherein the apparatus is configured such that the predetermined upload criterion takes accounts of one of:
   bandwidth capacities of communication network receivers along the planned route for a particular road data gatherer independently of planned routes of other road data gatherers; or
   bandwidth capacities of communication network receivers along the planned route for a particular road data gatherer dependent on the planned routes of other road data gatherers.

3. The apparatus of claim 1, wherein the apparatus is configured such that the predetermined upload criterion takes accounts of the bandwidth capacities of communication network receivers along the planned route for a particular road data gatherer dependent on the planned routes of other road data gatherers by considering an the expected proximity of multiple road data gatherers to a particular communications network receiver at a particular time.

4. The apparatus of claim 1, wherein apparatus is configured to update the indication during the planned route travelled by the road data gatherer based on one or more of:
   an update to the planned route of the road data gatherer;
   an update to a planned route of another road data gatherer;
   a change in bandwidth capacity of a communications network receiver; and
   an update relating to an amount of road data gathered by the road data gatherer or a road data gatherer in proximity to the road data gatherer.

5. The apparatus of claim 1, wherein the indication of one or more upload zones is a positive indication which indicates one or more of:
   permission for the road data gatherer to upload gathered road data to a communication network receiver associated with the upload zone; and
   an upload priority for road data gathered by the road data gatherer in respect of a permitted communication network receiver, the upload priority prioritizing one or more of one aspect of the gathered road data and one road data gatherer over another road data gatherer.

6. The apparatus of claim 1, wherein the indication of one or more upload zones is a negative indication which indicates one or more of:
   denial of permission for the road data gatherer to upload gathered road data to a communication network receiver associated with the upload zone; and
   an upload priority for road data gathered by the road data gatherer in respect of a permitted communication network receiver, the upload priority deprioritizing one or more of one aspect of the gathered road data and one road data gatherer over another road data gatherer.

7. The apparatus of claim 1, wherein the indication of one or more upload zones comprises one or more of:
   an identification of one or more communication network receivers;
   an indication of one or more geographic areas associated with one or more communication network receivers; and
   an identification of one or more road segments or portions of road segments associated with the one or more communication network receivers.

8. The apparatus of claim 1, wherein the apparatus is configured such that the indication is provided to one or more of:
   a communication network receiver associated with an indicated upload zone;
   the road data gatherer; and a server or a module for one of the same.

9. The apparatus of claim 1, wherein at least one of the road data gatherer and the communication network receiver is configured to infer, based on the provided indication of one or more upload zones, permission or denial of permission for the road data gatherer to upload gathered road data to a communication network receiver associated with a particular non-indicated upload zone.

10. The apparatus of claim 1, wherein a road data gatherer is one or more of: a vehicle, an autonomous vehicle, a navigation device or a module for one of the same.

11. The apparatus of claim 1, wherein the road data gathered by the road data gatherer relates to one or more of current weather conditions, environmental conditions, road conditions, road obstructions, peripheral scenery, objects in a line of sight, new buildings along a road, new objects along a road, and moving objects on or along a road.

12. A computer-implemented method comprising:
   calculating a planned route to be travelled by a road data gatherer based on a received destination for the road data gatherer;
   generating an indication of one or more communication network receiver upload zones for a road data gatherer along the planned route for one or more respective time periods, the indication being determined according to a predetermined upload criterion, that takes account of received information about the available bandwidth capacities of communication network receivers at the one or more respective time periods along the planned route, so that the indication specifies specify communication network receivers to be used or not used by the road data gatherer to upload for uploading of road data in the one or more respective time periods; and
   providing the indication to guide uploading of the road data gathered by the road data gatherer.

13. The computer-implemented method of claim 12, wherein the predetermined upload criterion takes account of one of:
   bandwidth capacities of communication network receivers along the planned route for a particular road data gatherer independently of planned routes of other road data gatherers; or
   bandwidth capacities of communication network receivers along the planned route for a particular road data gatherer dependent on the planned routes of other road data gatherers.

14. The computer-implemented method of claim 12, wherein the predetermined upload criterion takes accounts bandwidth capacities of communication network receivers along the planned route for a particular road data gatherer dependent on the planned routes of other road data gatherers by considering expected proximity of multiple road data gatherers to a particular communications network receiver at a particular time.

15. The computer-implemented method of claim 12, further comprising:
   updating the indication during the planned route travelled by the road data gatherer based on an update to the planned route of the road data gatherer, an update to a planned route of another road data gatherer, a change in bandwidth capacity of a communications network receiver, or an update relating to an amount of road data gathered by the road data gatherer or a road data gatherer in proximity to the road data gatherer.

16. The computer-implemented method of claim 12, wherein the indication of one or more upload zones is a positive indication which indicates permission for the road data gatherer to upload gathered road data to a communication network receiver associated with the upload zone or an upload priority for road data gathered by the road data gatherer in respect of a permitted communication network receiver, the upload priority prioritizing one or more of one aspect of the gathered road data and one road data gatherer over another road data gatherer.

17. The computer-implemented method of claim 12, wherein the indication of one or more upload zones is a negative indication which indicates denial of permission for the road data gatherer to upload gathered road data to a communication network receiver associated with the upload zone or an upload priority for road data gathered by the road data gatherer in respect of a permitted communication network receiver, the upload priority deprioritizing one or more of one aspect of the gathered road data and one road data gatherer over another road data gatherer.

18. A non-transitory computer readable medium including instructions that when executed cause a processor at least to:
   calculate a planned route to be travelled by a road data gatherer based on a received destination for a road data gatherer;
   generate an indication of one or more communication network receiver upload zones along the planned route for the road data gatherer for one or more respective time periods, the indication being determined according to a predetermined upload criterion, that takes account of received information about the available bandwidth capacities of communication network receivers at the one or more respective time periods along the planned route, so that the indication specifies communication network receivers to be used or not used by the road data gatherer to upload road data in the one or more respective time period; and provide the indication to guide uploading of the road data gathered by the road data gatherer.

\* \* \* \* \*